(12) United States Patent
Lai et al.

(10) Patent No.: US 9,248,400 B2
(45) Date of Patent: Feb. 2, 2016

(54) ZEOLITIC IMIDAZOLATE FRAMEWORK MEMBRANES AND METHODS OF MAKING AND USING SAME FOR SEPARATION OF C2– AND C3+ HYDROCARBONS AND SEPARATION OF PROPYLENE AND PROPANE MIXTURES

(75) Inventors: Zhiping Lai, Thuwal (SA); Yichang Pan, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 778 days.

(21) Appl. No.: 13/484,427

(22) Filed: May 31, 2012

(65) Prior Publication Data

US 2012/0310018 A1 Dec. 6, 2012

Related U.S. Application Data

(60) Provisional application No. 61/491,663, filed on May 31, 2011.

(51) Int. Cl.
| | |
|---|---|
| *B01D 53/22* | (2006.01) |
| *B01D 67/00* | (2006.01) |
| *B01D 71/02* | (2006.01) |
| *C01B 3/50* | (2006.01) |
| *B01D 69/10* | (2006.01) |

(52) U.S. Cl.
CPC .............. *B01D 53/228* (2013.01); *B01D 53/22* (2013.01); *B01D 67/0051* (2013.01); *B01D 69/10* (2013.01); *B01D 71/028* (2013.01); *C01B 3/503* (2013.01); *B01D 2256/24* (2013.01); *B01D 2256/245* (2013.01); *B01D 2257/102* (2013.01); *B01D 2257/104* (2013.01); *B01D 2257/108* (2013.01); *B01D 2257/702* (2013.01); *B01D 2257/7025* (2013.01); *B01D 2325/02* (2013.01); *B01D 2325/023* (2013.01); *B01D 2325/04* (2013.01); *B01D 2325/20* (2013.01); *Y02C 20/20* (2013.01)

(58) Field of Classification Search
CPC ....................................................... B01D 53/22
USPC ................................................. 423/230, 702
See application file for complete search history.

(56) References Cited

U.S. PATENT DOCUMENTS

| | | | | |
|---|---|---|---|---|
| 4,857,078 | A | 8/1989 | Watler | 95/50 |
| 5,501,722 | A | 3/1996 | Toy et al. | 95/50 |
| 2007/0202038 | A1 | 8/2007 | Yaghi et al. | 423/702 |
| 2009/0214407 | A1 | 8/2009 | Reyes et al. | 423/230 |

FOREIGN PATENT DOCUMENTS

| | | |
|---|---|---|
| CN | 101432070 | 5/2009 |
| CN | 102006921 | 4/2011 |
| EP | 1 674 555 | 6/2006 |
| WO | WO 2009/105251 | 8/2009 |
| WO | WO 2009/105270 | 8/2009 |

OTHER PUBLICATIONS

International Preliminary Report on Patentability mailed Dec. 2, 2013 during examination of PCT/IB2012/001173.
Venna and Carreon, Supporting Information: "Highly Permeable Zeolite Imidazolate Framework-8 Membranes for CO2/CH4 Seperation", Department of Chemical Engineering, University of Louisville, JACS Communications, vol. 132, pp. 51-58, 2010.
PCT International Search Report and Written Opinion issued in PCT Application No. PCT/IB2012/001173, dated Nov. 15, 2012.
Banerjee et al., "High-Throughput Synthesis of Zeolitic Imidazolate Frameworks and Application of CO2 Capture", Science, vol. 319. pp. 939-943, Feb. 15, 2008.
Bux et al., "Zeolitic Imidazolate Framework Membrane with Molecular Sieving Properties by Microwave-Assisted Solvothermal Synthesis", JACS, vol. 131, pp. 16000-16001, 2009.
Huang et al., "Molecular-Sieve Membrane with Hydrogen Permselectivity: ZIF-22 in LTA Topology Prepared with 3-Aminopropyltriethoxysilane as Covalent Linker"Angew. Chem. Int. Ed., vol. 49, pp. 4958-4961, 2010.
Li et al., "Zeolitic imidazolate framework ZIF-7 based molecular sieve membrane for hydrogen separation", Journal of Membrane Science, vol. 354, pp, 48-54, 2010.
Liu et al., "Synthesis and characterization of ZIF-69 membranes and separation for CO2/CO mixture", Journal of Membrane Science, vol. 353, pp. 36-40, 2010.
Pan et al., "Rapid synthesis of zeolitie imidazolate framework-8 (ZIF-8) nanocrystals in an aqueous system", Chem. Commun., vol. 47, pp. 2071-2073, 2011.
Venna and Carreon, "Highly Permeable Zeolite Imidazolate Framework-8 Membranes for CO2/CH4 Separation", JACS, vol. 132, pp. 76-78, 2010.
Bux et al., "Ethene/ethane separation by the MOF membrane ZIF-8: Molecular correlation of permeation, absorption, diffusion", *Journal of Membrane Science*, 369:284-289, 2011.
Bux et al., "Oriented Zeolitic Imidazolate Framework-8 Membrane with Sharp $H_2/C_3H_8$ Molecular Sieve Separation", *Chemistry of Materials*, 23(8):2262-2269, 2011.
Extended European Search Report for EP 12792381.1, mailed Jul. 6, 2015.
Lee et al., "Kinetic Separation of Propene and Propane in Metal—Organic Frameworks: Controlling Diffusion Rates in Plate-Shaped Crystals via Tuning of Pore Apertures and Crystallite Aspect Ratios", *JACS*, 133(14):5228-5231, 2011.
McCarthy et al., "Synthesis of Zeolitic Imidazolate Framework Films and Membranes with Controlled Microstructures", *Langmuir*, 26(18):14636-14641, 2010.

*Primary Examiner* — Elvis O Price
(74) *Attorney, Agent, or Firm* — Norton Rose Fulbright US LLP (57) ABSTRACT

Certain embodiments are directed to processes for fabrication of zeolitic imidazolate framework (ZIF) membranes. These ZIF membranes can be used in separating C2– hydrocarbons from C3+ hydrocarbons and propylene/propane mixtures.

23 Claims, 6 Drawing Sheets

ZEOLITIC IMIDAZOLATE FRAMEWORK MEMBRANES AND METHODS OF MAKING AND USING SAME FOR SEPARATION OF C2- AND C3+ HYDROCARBONS AND SEPARATION OF PROPYLENE AND PROPANE MIXTURES

This application claims the benefit of U.S. Provisional Patent Application No. 61/491,663, filed May 31, 2011, which is incorporated herein by reference in its entirety.

BACKGROUND OF THE INVENTION

I. Field of the Invention

Embodiments of this invention are directed generally to a process of making Zeolitic Imidazolate Framework materials and their use as membranes for separation of hydrocarbons.

II. Background

Zeolitic Imidazolate Frameworks (ZIFs) are a novel type of crystalline microporous materials. ZIFs are structurally similar to zeolites and other crystalline materials. ZIFs are comprised of metal ions or metal clusters bridged through a nitrogen atom of imidazolate ligands or their derivatives (Banerjee et al., Science, 2008, 319, P939), as compared to zeolites that are structures comprised of tetrahedral $Si(Al)O_4$ joined by bridging oxygen. ZIFs belong to microporous materials because their pore size is typically less than 2 nm. The regular pore structure of ZIFs can differentiate gas molecules on the atomic level. Hence, ZIFs have potential to be used for gas separations, either in powder form or in a continuous membrane form.

US Patent Publication 2007/0202038, which is incorporated herein by reference in its entirety, describes synthesis of a family of ZIF materials and the methods of using them as adsorbents for $H_2$ and $CO_2$ storage. PCT Publication WO 2009/105270, which is incorporated herein by reference in its entirety, describes the use of ZIF crystals as adsorbents in a pressure swing or temperature swing process to recover $H_2$ out of natural gas. PCT Publication WO 2009/105251, which is incorporated herein by reference in its entirety, describes different types of ZIF structures including ZIF-1, ZIF-7, ZIF-8 and ZIF-11 that were utilized as adsorbents to separate methane out of C2+ hydrocarbons. PCT Publication WO 2009/105251 also describes a membrane process based on these ZIF materials; however, the membrane described in WO 2009/105251 was prepared using ZIF crystals and binders. The separation mechanism is based on selective adsorption of C2+ over methane, and hence the membrane is more permeable to C2+ hydrocarbons.

There remains a need for additional materials for the sharp, efficient separation of multi-component gas mixtures.

SUMMARY OF THE INVENTION

Certain embodiments are directed to processes for fabrication of zeolitic imidazolate framework (ZIF) membranes. ZIFs are metal ions or metal clusters, including, but not limited to Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, and/or Rg bridged through the nitrogen atom of imidazolate ligands or their derivatives, including, but not limited to imidazolate substituted with a methyl, halide, F, Cl, Br, CN, or CHO group. In certain aspects the imidazolate is imidazolate, benzimazolate, purinate, 4 or 5 azabenzimadozolate (see U.S. Patent Publication 2007/020038, which is incorporated herein by reference for a description of various imidazolate derivatives). Imidazolate is depicted in structure I, wherein M represents a metal ion or metal ion cluster. Examples of imidazolate derivatives are depicted in structures II to VI.

Structure I

Structure II

Structure III

Structure IV

Structure V

Structure VI

These ZIF membranes can be used in separating C2- hydrocarbons from C3+ hydrocarbons. The term "C2- hydrocarbons" refers to hydrocarbon compound containing two or less carbon atoms, e.g., methane, ethane, ethylene, etc.—including hydrogen, helium, nitrogen, oxygen, carbon-dioxide, and the like. The term "C3+ hydrocarbons" refers to any hydrocarbon compound containing three or more carbon atoms, e.g., propane, propylene, butane, butylene, isobutane, and heavier hydrocarbons, etc. The terms "C2", "C3" and "C4" are defined as hydrocarbon compounds containing two, three and four carbon atoms, respectively. The term "C2+ hydrocarbons" is defined as any hydrocarbon compound containing two or more carbon atoms. In certain aspects, the C2- hydrocarbon compound is selected from ethanol, ethane, ethylene, methane, and hydrogen. In a further aspect the C3+ hydrocarbon compound is propane, propylene, butane, butylene, isobutene, 1-propanol, isopropanol, butanol, etc. In certain aspects the mixture to be separated is a binary mixture with at least one component from C2- hydrocarbons, and at least a second component from C3+ hydrocarbons. Some examples of such binary mixtures include ethane/propane, ethylene/propylene, ethane/propylene, ethylene/propane, methane/propane, methane/propylene, hydrogen/propane, hydrogen/propylene, ethane/butane, ethane/butylene, methane/butane, methane/butylene, nitrogen/propane, oxygen/propane, ethanol/propanol, ethanol/isopropanol, ethanol/butanol, etc. In certain aspects, the binary mixture is propylene/propane.

For multicomponent mixtures such as ethane-ethylene-propane-propylene, the process of the current invention can separate the mixture into two streams, one stream enriched in ethane-ethylene, the other stream enriched in propane-propylene. The membrane processes can also achieve certain separation for binary mixtures of C2−, or binary mixtures of C3+. In certain aspect the membrane can achieve separation of propane and propylene.

Dense ZIF membranes with thickness ranging from 1 to 100 micrometers are fabricated through two methods, namely, in-situ crystallization and seeded growth, on porous supports such as porous alpha-alumina, stainless-steel, nickel, glass, and polymer. The porous supports have pores much larger than the pore size of the ZIF membranes, and should have mechanical strength high enough to avoid mechanical failure of the membrane unit under the operation pressure range. The porous supports can be flat-sheet, tubular, hollow fiber or monolithic modules. In certain aspects no binder is required during the membrane formation process, although some kinds of fillers may be utilized in post-treatment to seal membrane defects.

To achieve sharp separation between C2− and C3+ hydrocarbons, the ZIF membranes are preferred to have a pore size that is in a range from about, at least, or at most 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, nm to 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50 nm (including all values and ranges there between. In a further aspect the pore sizes range from 0.32 to 0.38, and most preferably from 0.33 to 0.36 nm.

Certain aspects include, but are not limited to ZIF materials having the same topology as ZIF-8, ZIF-65, ZIF-7, and ZIF-67 materials.

Certain embodiments are directed to membrane separation processes where a mixture of C2− and C3+ hydrocarbons come contacting one surface of a ZIF membrane, a feed side. C2− hydrocarbons can traverse the membrane, reaching the other side of the membrane, the permeate side of the membrane, faster than C3+ hydrocarbons. As a result, the stream retrieved from the permeate side has a higher concentration of C2− hydrocarbons compared to the feed stream. While the stream retained on the feed side, the retentate stream, has higher concentration of C3+ hydrocarbons compared to the initial feed stream.

In a further embodiment a method is provided to separate mixtures of propylene and propane components, comprising (a) providing a stream containing a propylene component and a propane component; (b) providing a ZIF membrane comprising a plurality of porous ZIF grains that form a ZIF layer supported on a support materials, wherein the ZIF layer has a thickness in the range from 1 micron to 100 micron and a pore size in the range from 0.2 nm to 0.5 nm; and (c) performing a membrane separation process by feeding the stream to be separated to the feed side of the membrane such that propylene will pass preferentially through the membrane thereby providing a permeate stream enriched in propylene and a retentate enriched in propane.

Thus, in one example, a ZIF membrane of the embodiments can separate a mixture comprising propylene and propane with a separation factor of at least or greater than 3, 5, 10, 15, 20 or 25, with permeance of propylene of at least or greater than 10, 50, 100 150, or $200 \times 10^{-10}$ [mol/m2 s Pa].

In one example, a ZIF membrane of the embodiments (e.g., with a pore size of 0.34 nm) can separate a mixture comprising $H_2$/propane with separation factor of at least or greater than 100, 200, 300, 400, 500 or more, and permeance of Hydrogen at least or more than 1000, 2000, 3000, $4000 \times 10^{-10}$ [mol/m² s Pa], or more.

In another example, a ZIF membrane of the embodiments (e.g., with a pore size of 0.34 nm) can separate a mixture comprising $H_2$/propylene with separation factor at least or greater than 5, 10, 20, 30 or more, and permeance of Hydrogen at least or more than 1000, 2000, 3000, $4000 \times 10^{-10}$ [mol/m² s Pa], or more.

In another example, a ZIF membrane of the embodiments (e.g., with a pore size of 0.34 nm) can separate a mixture comprising ethane/propane with separation factor of at least or greater than 40, 50, 60, 70, 80 or more and permeance of ethane of at least or more than 500, 600, $700 \times 10^{-10}$ [mol/m² s Pa] or more.

In another example, a ZIF membrane of the embodiments (e.g., with a pore size of 0.34 nm) can separate a mixture comprising ethylene/propylene with separation factor of at least or more than 5, 10, 20 or more, and permeance of ethylene more than 600, 700, 800, 900, $1000 \times 10^{-10}$ [mol/m² s Pa] or more.

In another example, a ZIF membrane of the embodiments (e.g., with a pore size of 0.34 nm) can separate a mixture comprising propylene/propane with separation factor of at least more than 10, 20, 30, 40 or more, and permeance of propylene more than, 100, 200, $300 \times 10^{-8}$ [mol/m² s Pa] or more.

In another example, a ZIF membrane of the embodiments (e.g., with a pore size of 0.34 nm) can separate a mixture comprising ethanol/isopropanol with separation factor of at least more than 200, 500, 1000 or more, and permeance of ethanol more than, 6, 8, $10 \times 10^{-8}$ [mol/m² s Pa] or more.

In another example, a ZIF membrane of the embodiments (e.g., with a pore size of 0.34 nm) can separate a mixture comprising ethanol/butanol with separation factor of at least more than 500, 800, 1000 or more, and permeance of ethanol more than, 6, 8, $10 \times 10^{-7}$ [mol/m² s Pa] or more.

In certain aspects the membrane provides a higher selectivity than ZIF membranes reported in open literature. The membranes produced by the processes described herein provide sharp separation (selectivity larger than 10) of various multi-component mixtures, such as ethane/propane, ethylene/propylene, ethane/propylene and ethylene/propane.

The ZIF membrane described herein can be fabricated in an aqueous solution at temperature lower than 100° C. This is in contrast to the typical ZIF membrane processes that use solvents such as methanol and DMF at temperatures higher than the boiling point of these solvents. Hence, the membrane fabrication process described herein is more green and economic.

Other embodiments of the invention are discussed throughout this application. Any embodiment discussed with respect to one aspect of the invention applies to other aspects of the invention as well and vice versa. The embodiments in the Example section are understood to be embodiments of the invention that are applicable to all aspects of the invention.

The use of the word "a" or "an" when used in conjunction with the term "comprising" in the claims and/or the specification may mean "one," but it is also consistent with the meaning of "one or more," "at least one," and "one or more than one."

It is contemplated that any embodiment discussed herein can be implemented with respect to any method or composition of the invention, and vice versa. Furthermore, compositions and kits of the invention can be used to achieve methods of the invention.

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or." It is also contemplated that anything listed using the term "or" may also be specifically excluded.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

By "consisting of" is meant including, and limited to, whatever follows the phrase "consisting of". Thus, the phrase "consisting of" indicates that the listed elements are required or mandatory, and that no other elements may be present.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Fabrication of thin and dense ZIF membranes from organic solvents on to porous supports without any binders has been reported in the scientific literature. These membranes are made primarily using two methods, (1) in-situ crystallization and (2) seeded growth. In certain instances the porous support surface needs to be pre-treated either thermally or chemically, and in certain procedures this pre-treatment is critical in obtaining a continuous membrane. The main difference of the two methods is that in the seeded growth method the support needs to be pre-coated with a seed layer, typically from nanoparticles of the same ZIF structure as the membrane. The seeded support in the seeded growth method, or the bare support in the in-situ crystallization method, is then contacted with a synthesis solution, which is typically prepared by mixing the metal and imidazolate precursors with a solvent. All the above-mentioned ZIF membranes are synthesized from organic solvent such as methanol and dimethyl formamide (DMF). The concentration of the metal and imidazolate precursors in the synthesis solution should be under a supersaturation condition. At certain synthesis temperature, pressure and time, a dense layer with the desired ZIF structure can be selectively formed at the interface between the support and the synthesis solution.

The pre-coated seed layer in the seeded growth method can direct the crystallization on the support surface. It can also eliminate the effects of the support, and make it possible to fabricate ZIF membranes on different types of supports, such as alpha-alumina, stainless steel, nickel, glass and even polymers. Furthermore, the seeded growth method can control and optimize the microstructure of ZIF membranes, such as the orientation of the pores and the grain-boundary structure, which in many cases can significantly improve the membrane performance. Many of the above-mentioned ZIF membranes have shown promising, yet sub-optimal separation performance for separation of simple gases, such as separation of Hydrogen and $CO_2$.

In one embodiment, the ZIF membranes developed in the present invention are able to achieve sharp separation between C2 and C3 hydrocarbons by molecular sieving effect. In another embodiment, the ZIF membrane developed in the present invention are able to achieve sharp separation between C2– and C3+ hydrocarbons and between propylene and propane.

Mixtures of C2– and C3+ hydrocarbons can be widely found in chemical and petroleum industries. For example, light hydrocarbons such as hydrogen, methane, C2, C3 and C4 are the major components of natural gas and petroleum refining gas. Separation to obtain pure component of these hydrocarbons is highly desired as all of them are important feedstocks in chemical industry. The most widely used separation technology in the current industry is cryogenic distillation, which is very energy and capital intensive. Other methods such as liquid absorption, pressure-swing adsorption and temperature-swing adsorption have also been commercialized. However, liquid absorption suffers from loss of solvent, while the adsorption process needs regeneration and reuse of the adsorbent which often requires large amount of energy and expensive equipment.

Membrane methodology, in principle, can provide an energy-efficient and cost-efficient process for gas separations. Furthermore, the membrane process is environmental benign, easy to operate, easy to scale-up and requires less foot-print. Numerous membranes based on polymeric materials have been developed—U.S. Pat. No. 4,857,078 describes a rubbery polymeric membrane to remove C3+ hydrocarbons out of natural gas and U.S. Pat. No. 5,501,722 describes a polymeric membrane process using a glassy PTMSP membrane. Polymeric membranes often rely on solubility difference to separate gases. Higher solubility will lead to higher permeability across the membrane. Since heavier hydrocarbons often adsorb more on polymer, and hence polymeric membranes are often more permeable to heavier hydrocarbons. However, high solubility will also cause the plasticization issue which will reduce the membrane selectivity. A selectivity vs. permeability trade-off curve, which is often named as Robenson curve, often give the limit of the separation performance that most polymeric membranes can achieve. Specifically, although many polymeric membranes can separate methane or hydrogen out of C2+ hydrocarbons fairly efficient, few can achieve sharp separations between C2 and C3 hydrocarbons and between propylene and propane.

Figure 1:
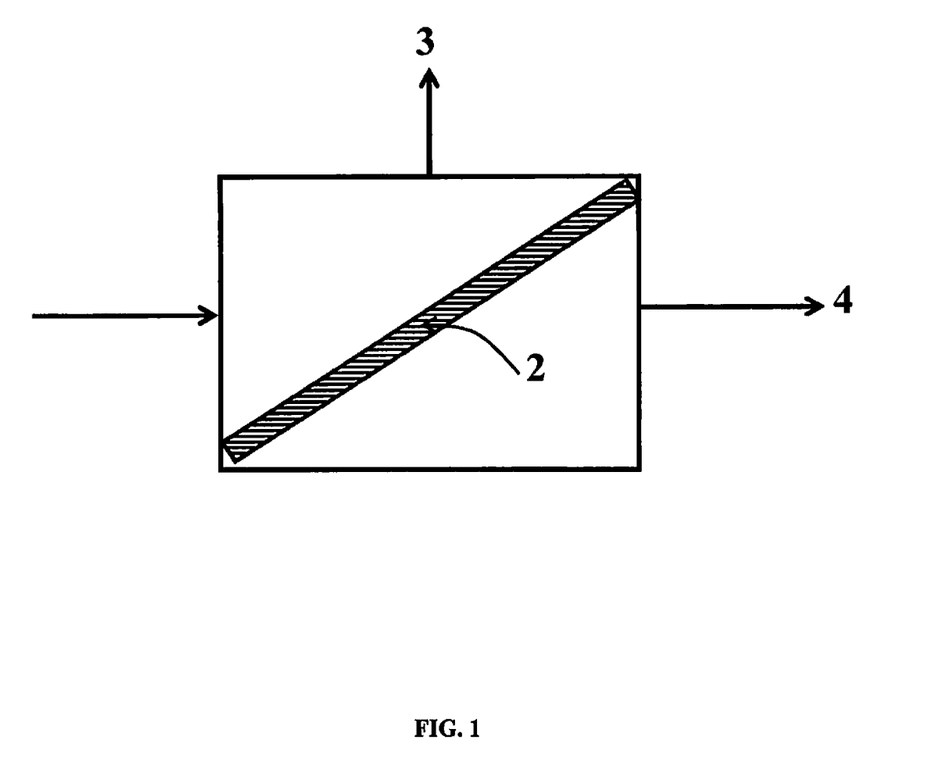
FIG. 1: The schematic drawing of the process of the invention in its simplest form.

The membrane separation process is shown schematically in its simplest form in FIG. 1. Referring to FIG. 1, a feed gas stream 1 passes to membrane separation unit 2 containing one or more membranes. The membrane separation step involves running the feed gas stream across a membrane that is selectively permeable to C2− hydrocarbon compounds and concentrate them in permeate stream 4 permeating the membrane; the residue or retentate, non-permeating stream 3 is correspondingly concentrated with C3+ hydrocarbon compounds.

The performance of the membrane separation process is often described by flux and selectivity. The flux is defined as the amount of a component, normally in molars, passed through a unit membrane area within a unit time. Flux is governed by Fick's law of diffusion. In simple cases, Fick's law leads to the equation $$J = D \cdot \frac{\Delta C}{L} \quad (1)$$

Where J is the flux, D is the diffusivity, L is the membrane thickness, and ΔC is the concentration difference. If the separation is carried out at low pressure, the partial pressure will have a linear relationship with concentration by a Henry constant, S, and equation (1) can be rewritten as $$Q = \frac{J}{\Delta P} = D \cdot S / L \quad (2)$$

In this case, permeance, Q, the pressure normalized flux is a more convenient quantity for membrane permeability as it eliminated the effects of the transmembrane pressure drop, ΔP. A convenient unit for permeance Q is $[10^{-10} \text{ mol/m}^2 \text{ s Pa}]$.

The ideal selectivity, $\alpha_{A,B}$, for gas A over B, is defined as the ratio of the permeance measured in single-component.

$$\alpha_{A,B} = \frac{Q_A}{Q_B} = \left(\frac{D_A}{D_B}\right)\left(\frac{S_A}{S_B}\right) \quad (3)$$

In mixture, the selectivity may significantly different from the ideal selectivity. The real or actual selectivity is defined by Separation factor, SF, which is calculated from the following equation.

$$SF = \frac{C_A^P / C_B^P}{C_A^F / C_B^F} \quad (4)$$

Superscript P denotes the concentration measured at the permeate side, and F the feed side. If all gas components can be treated as ideal gas, separation factor SF should equal to the ideal selectivity. However, significant discrepancy is often observed, particularly when one component is more condensable, or interacts stronger than others with the membrane framework.

The membrane is made of zeolitic imidazolate framework materials. The framework structure of ZIFs is comprised of metal ions or metal clusters interconnected by nitrogen atoms of imidazolate anions or their derivatives, forming microporous crystalline structures having framework topologies commonly found in zeolites and/or in other crystalline materials. The maximum access window size of a ZIF material is defined as its pore size, which can be determined by either adsorption studies or by calculation from its crystal structure. Membranes of the invention include, but are not limited to ZIF materials with pore size between 0.2 nm to 0.5 nm. Some examples include ZIF-7 (0.3 nm), ZIF-8 (0.34 nm), ZIF-65 (0.34 nm) and ZIF-67 (0.34 nm).

The size of a molecule is often defined by its kinetic diameter. For example, the kinetic diameter of ethane is ~0.38 nm, propane around 0.4 nm. In principle, molecules with kinetic diameter bigger than ZIF pore size cannot access to ZIF pores. In membrane form, this means the molecule cannot pass through the membrane. However, due to structure flexibility as well as membrane defects, substantial amount of molecules may still pass, but nevertheless, the bigger the molecule, the more resistance is the transport, and hence the less the amount molecules can pass through the membrane. Such molecular size effect to the transport rate is termed as molecular sieving effect. Not being bound or limited by theory, it is believed that the membrane process in the present invention utilizes this mechanism to achieve sharp separation among C2− and C3+ hydrocarbons. Hence, when a mixture of C2− and C3+ hydrocarbons is fed to the membrane process of the present invention, the smaller C2− hydrocarbons will pass through the membranes much faster than C3+ hydrocarbons. This separation mechanism is substantially different from the ZIF membranes described in patent WO 2009/105251 in which it claimed that heavier hydrocarbons should preferably pass across the membrane.

The kinetic diameters of ethane and propane are about 0.38 nm and 0.40 nm, respectively. To achieve sharp separation, the pore size of the utilized ZIF materials should be somewhere in between. However, molecules may enter pores with nominal pore size smaller than the kinetic diameter of the molecule. For example, ZIF-8 has a nominal pore size of 0.34 nm. It was found that both ethane and propane can pass through ZIF-8 membranes, but propane is much more difficult. One reason for this discrepancy is because the molecular size and the pore size are often measured in different ways. The molecular size is often obtained from kinetic studies, while the pore size of ZIF materials is calculated from crystal structure, or measured from adsorption studies. Another reason is that the structure of ZIF has certain flexibility. Examples in the present invention indicate that ZIF membranes with pore size between 0.20 and 0.50 nm can offer sharp separation to C2− and C3+ hydrocarbon mixtures. In preferred embodiments of the present invention, the ZIF membranes are selected from ZIF-7, ZIF-8, ZIF-65, and ZIF-67. In another preferred embodiments of the present invention, the ZIF membranes are selected from ZIF-8 (comprising Zn) and ZIF-67 (comprising Co).

ZIF membranes can be prepared by hydrothermal process when the solvent is water or solvothermal process when the solvent is organic solvent. One technique is in situ crystallization, and the other is seeded growth. In the in situ crystallization method, a porous support is exposed to a synthesis solution which contains metal and imidazolate precursors dissolved in a solvent. If the synthesis temperature is higher than the boiling point of the solvent, the synthesis must be carried out in a pressure vessel. After some time, a dense membrane can be obtained on the support surface. In the seeded growth technique, the synthesis must involve two steps. The first step is to synthesize ZIF crystals, preferably nanoparticles, and then coated on the support surface as a seed layer. In the second step, the seeded support is exposed to a synthesis solution which contains metal and imidazolate precursor dissolved in a solvent. The seeded growth method is used rather than the in situ crystallization in many cases as the seed layer can help reduce defects as well as effect of the support. Often the membrane made by the seeded growth method show improved performance than membranes made by the in situ crystallization method. The membrane quality can be affected by many factors, such as solvent type, synthesis temperature, synthesis time, and particle size of the seed layer in the seeded growth method.

In certain aspects the ZIF membranes are synthesized in an aqueous solution at low temperature between 10 to 100° C., lower than the boiling point of water in ambient condition. In a further aspect ZIF membranes are synthesized from 2 h to 12 h. In another aspect nanoparticles less than 1 micrometer were used as seeds. The prior synthesis processes for ZIF particle synthesis are carried out in organic solvent at temperature higher than the boiling point of the solvent. In the present processes ZIF membranes can be synthesized from an aqueous solution at low temperature—this process can significantly reduce the fabrication cost and is more environmental benign.

In certain aspects ZIF membranes are made by the seeded growth method. The seed layer can effectively eliminate the effect of support. Using the seeded growth method, ZIF membranes of the present invention can be fabricated on different porous supports, including alpha-alumina, stainless steel, nickel, glass, and even polymer. The purpose of using a support is to provide mechanic strength to the membrane unit. The pore size of the support normally should be much larger than the pore size of the ZIF membranes. Typically the pore size of the support is ranged from 100 nm to several micrometers. The structure of support can be symmetric or asymmetric. The support can be flat-sheet, tube, monolith, or preferably hollow fiber.

Certain membranes may contain defects. The term "defect" herein is referred to any pathway that is bigger than the pore size of the ZIF materials. Defects may be formed due to improper mixing during synthesis or mismatch of the thermal expansion coefficient between ZIF material and the support during heating, or improper handing during packing. In one embodiment of the invention, defects can be selectively sealed by a silica sol. In this process, a defective membrane is contacted with a liquid silica sol for a certain time. Some sol will be sucked into defects due to capillary force. After dried, the sol inside defects consolidates and therefore seals the defects. Some polymers, such as ethylene/vinyl acetate (EVA) described in U.S. Pat. No. 5,501,722 can also be used for this purpose.

The driving force for permeation across the membrane is the partial pressure difference of the component between the feed and permeate sides, which can be generated in different ways. The feed side can be operated under pressure. The highest pressure that can be applied depends on the mechanical strength of the support. Stainless steel and nickel supports normally should be strong enough for any practical applications. High pressure, however, may need expensive compressor and large amounts of energy. In this case, the permeate side can be evacuated to maintain a high feed to permeate pressure ratio.

Depending on the performance characteristics of the membrane, and the operating parameters of the system, the membrane process can be designed to achieve various levels of separation requirements. This includes single-stage, multi-stage, multistep, or more complicated arrays of two or more membrane units connected in series or cascade arrangements.

The applications of the present invention involve streams containing C2− and C3+ hydrocarbons that require separation of C2− from C3+. Such streams can be found in various chemical and petroleum industrial processes such as, to name a few, natural gas processing, petroleum refining, and chemical reactions systems that involve C2− and C3+ as either reactants or products.

I. EXAMPLES

The following examples are given for the purpose of illustrating various embodiments of the invention and are not meant to limit the present invention in any fashion. One skilled in the art will appreciate readily that the present invention is well adapted to carry out the objects and obtain the ends and advantages mentioned, as well as those objects, ends and advantages inherent herein. The present examples, along with the methods described herein are presently representative of preferred embodiments, are exemplary, and are not intended as limitations on the scope of the invention. Changes therein and other uses which are encompassed within the spirit of the invention as defined by the scope of the claims will occur to those skilled in the art.

Example 1

Synthesis of ZIF-8 Nanoparticles

ZIF-8 seeds were synthesized in aqueous solutions with alteration to the method reported by Pan et al (*Chem. Commun.*, 2011, 47, p2071). $Zn(NO_3)_2.6H_2O$ (1.17 g) and 2-methylimidazole (22.70 g, excess) were dissolved in deionized (DI) water (88 mL), and the resulting mixture was stirred at room temperature for 12 h. The obtained white powder was washed with DI water and methanol for three times, respectively, and then dried at temperatures greater than 65° C. for 24 h under vacuum.

Figure 2:
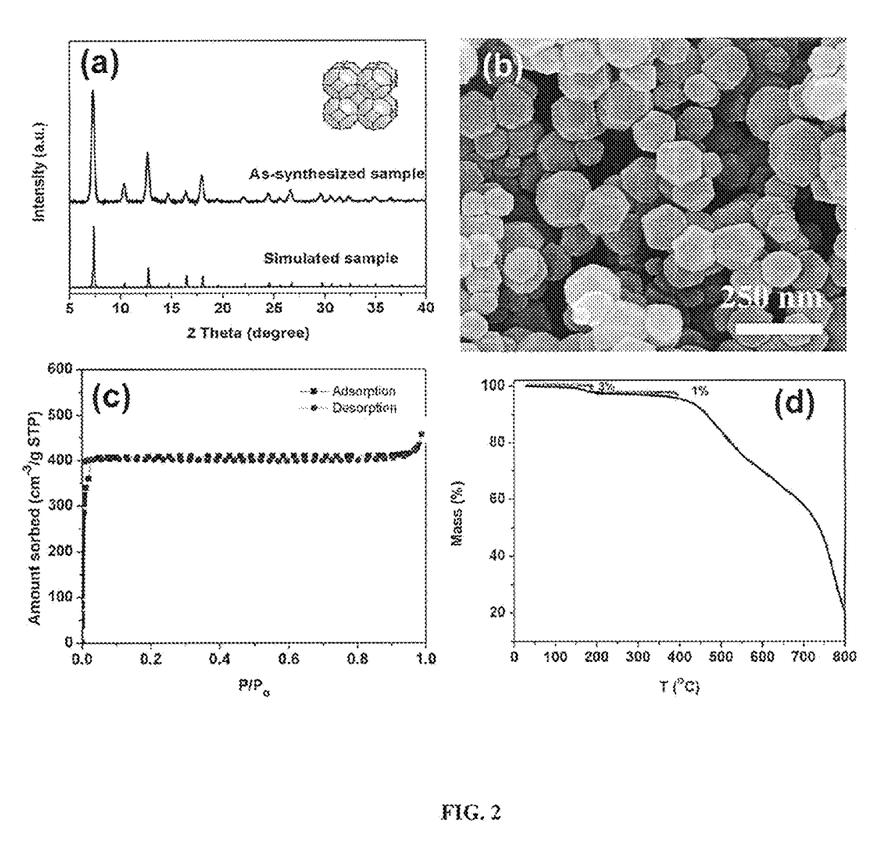
FIG. 2: (a) XRD patterns, (b) SEM picture, (c) $N_2$ sorption isotherms, and (d) thermal gravimetric analysis curves conducted at air of ZIF-8 seeds prepared in aqueous solutions

The X-ray diffraction (XRD) pattern (FIG. 2A) confirmed that all seed crystals are pure form of ZIF-8 structure. SEM picture (FIG. 2B) shows that particles exhibit the typical polyhedral shape and the mean particle size is in the average range of about 110 nm (±50 nm). Furthermore, $N_2$ adsorption experiment (FIG. 2D) shows that the microporous volume and BET surface area of the as-synthesized sample are ca. 0.7 $cm^3/g$ and 1250 $m^2/g$, respectively, indicating that the resulting products are of sufficient porous structure. Thermal gravimetric analysis shows that ZIF-8 crystals prepared in aqueous solution have high thermal stability, stable under the temperature as high as 400° C. at air.

Example 2

Synthesis of ZIF-8 Membrane by Seeded Growth

The ZIF-8 membrane was prepared in aqueous solution using a seeded growth method. First, the above prepared ZIF-8 seeds were dispersed in methanol to form a seed suspension of minimum 0.1 wt %. The seed was then deposited on the surface of a porous α-alumina disc (2 mm thickness and 22 mm diameter) by a slip-coating method using the seed suspension. Subsequently, the seeded discs were placed vertically using a Teflon holder in a 45 mL Teflon beaker for hydrothermal synthesis at 30° C. for 6 h. The synthesis solution prepared by mixing 0.11 g $Zn(NO_3)_2 \cdot 6H_2O$, 2.27 g 2-methylimidazole and 40 mL DI water. After synthesis the discs were taken out, rinsed three times by water and methanol, and then immersed in 30 mL fresh methanol for another 12 h. Finally, the discs were dried in ambient conditions for 24 h.

Figure 3:
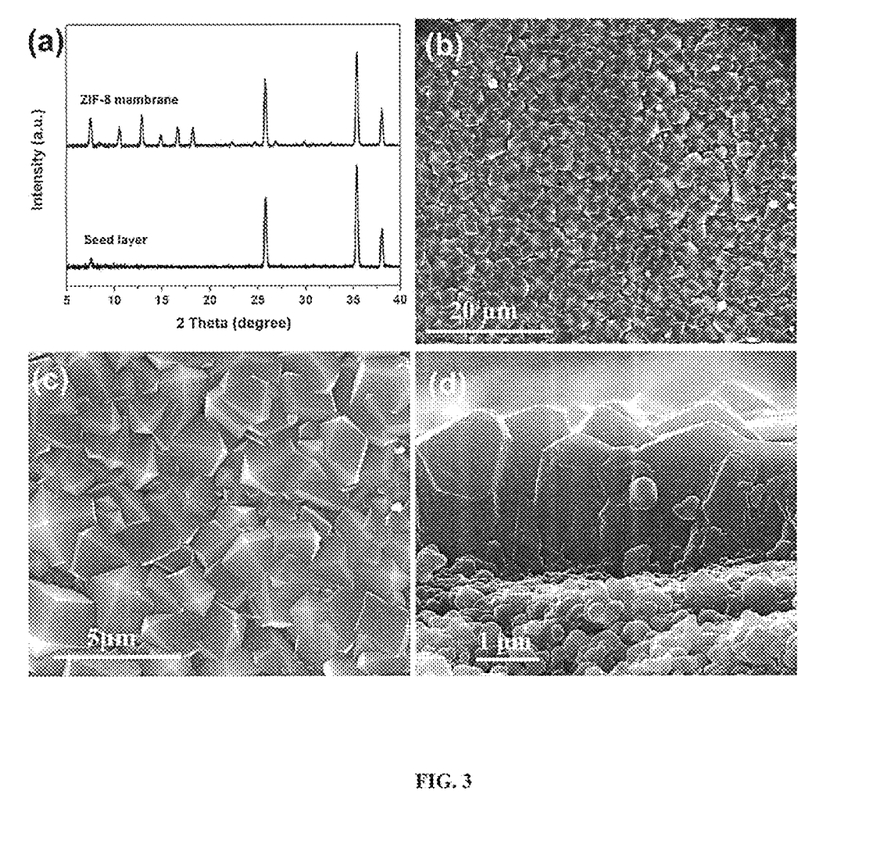
FIG. 3: (a) XRD pattern of the as-synthesized ZIF-8 membrane, (b, c) SEM picture of top view of the as-synthesized ZIF-8 membrane, (d) SEM picture of cross section of the as-synthesized ZIF-8 membrane.

FIG. 3A shows the XRD pattern of the as-synthesized membrane, and it confirms that the crystal structure of the membrane is pure-phase ZIF-8 structure. From the top view of the as-synthesized membrane (FIGS. 3B and 3C), the crystals are well intergrown. The membrane is compact and continuous. The cross section SEM picture shows that the thickness of membrane is about 3 µm.

Example 3

Synthesis of ZIF-65 Membranes by In-Situ Crystallization 0.075g (0.66 mmol) 2-Nitroimidazole and 0.099 g (0.33 mmol) $Zn(NO_3)_2 \cdot 6H_2O$ were dissolved in 20 ml DMF. The reaction solution was loaded into the Teflon-lined autoclave. A dry α-alumina disc was placed horizontally inside the solution with the smooth surface facing upward. The solution was sealed and heated to 110° C. for 72 h. After cool down to room temperature, the disc was taken out and rinsed three times with fresh methanol to remove any solvent on the surface, and then immersed in 50 ml fresh methanol for another 24 h to exchange the solvent occluded in the channels. After that the disc was dried at 60° C. overnight.

Figure 4:
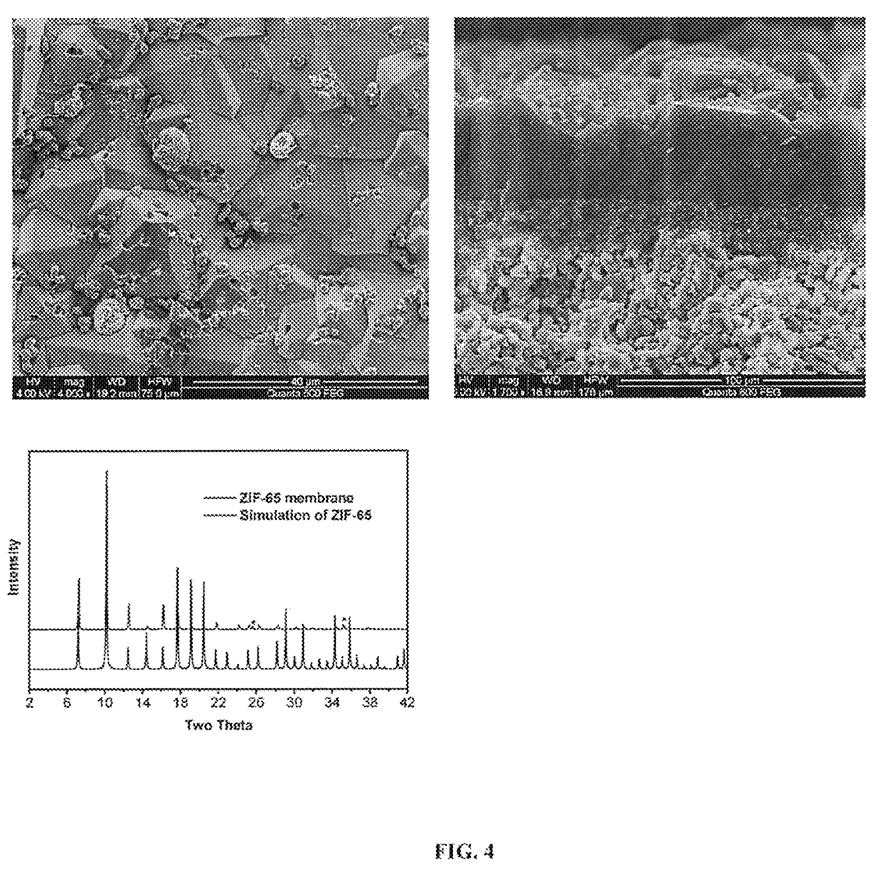
FIG. 4: SEM images and XRD patterns of ZIF-65 membranes

FIGS. 4A and 4B shows the top-view and the cross-section SEM image of the as-synthesized ZIF-65 membrane. FIG. 4C shows the XRD pattern of the ZIF-65 membranes, which indicates that the obtained membrane is the pure form of ZIF-65.

Example 4

Synthesis of ZIF-7 Membranes on Zinc Oxide Modified Alpha-Alumina Support by In-Situ Crystallization Porous alpha-alumina supports were first surface-modified with ZnO through the following sol-gel process. $ZnAc_2 \cdot 2H_2O$ (6.018 g) was dissolved in a mixture of ethanolamine (4.581 g, 4.537 ml) and 2-methoxyethanol (50 ml) and then stirred at 60° C. for 3 h. A clear and homogeneous solution was obtained and used as the coating solution. This precursor solution was deposited on the smoothed surface of alumina disc by spin-coating (600 rpm, 20 s). The coated alumina discs were preheated at 300° C. for 10 min after each coating. This procedure was repeated 5 times. The coated alumina discs were subsequently heated to 600° C. for 3 h in order to obtain crystallized ZnO. Finally, the coated alumina discs were cooled to room temperature and kept in a desiccator for later use.

ZIF-7 membranes synthesized on ZnO modified alumina support were achieved as follows. Firstly, 0.12 g (0.1 mmol) benzimidazolate (bim) and 0.21 g (0.07 mmol) $Zn(NO_3)_2 \cdot 6H_2O$ were dissolved in 20 ml DMF. This solution was then loaded into a Teflon-lined autoclave with a ZnO modified alumina disc. The solution was sealed and heated to 130° C. for 48 h. After synthesis the autoclave was cooled to room temperature. Then the disc was taken out and rinsed three times with fresh methanol to remove any solvent on the surface, and then immersed in 30 ml fresh methanol for another 12 h to exchange the solvent that is occluded inside the channels of ZIF-7. Finally, the disc was vacuum dried at 60° C. for 24 h.

Figure 5:
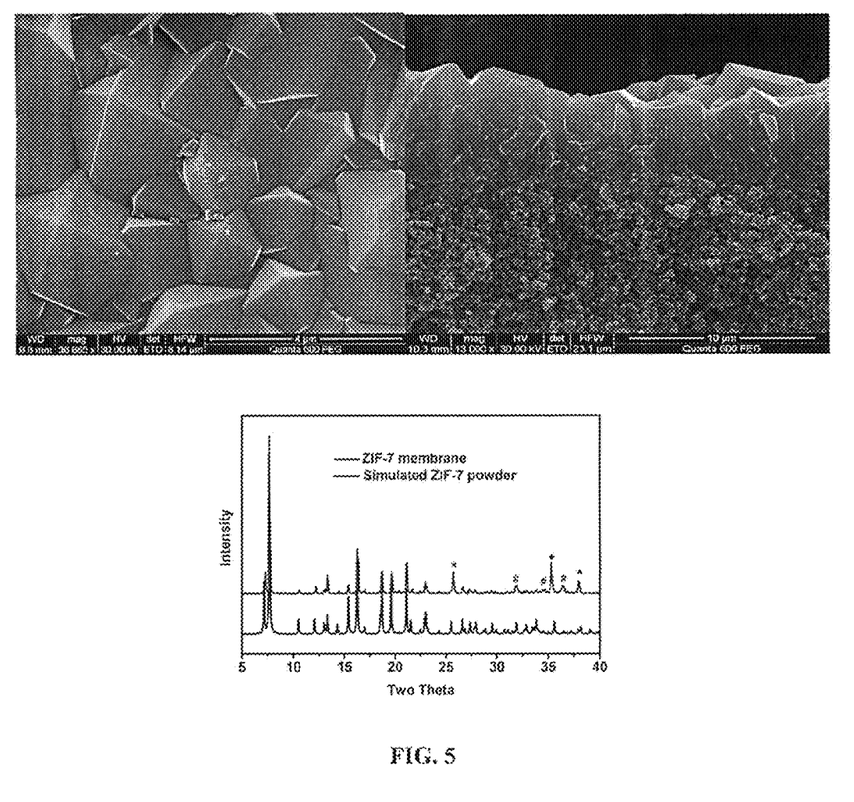
FIG. 5: SEM pictures of the top view and cross section of the as-synthesized ZIF-7 membrane. The XRD pattern of the membrane agrees well with the simulated XRD pattern in term of the peak positions, indicating that pure phase of ZIF-7 was obtained.

FIGS. 5A and 5B show the top-view and the cross-section SEM image of the as-synthesized ZIF-7 membrane. FIG. 5C shows the XRD pattern of the ZIF-7 membranes, which indicates that the obtained membrane is the pure form of ZIF-7.

Example 5

Synthesis of ZIF-67 Membranes by Seeded Growth

Firstly, ZIF-67 seeds were prepared by mixing 1.17 g $Co(NO_3)_2 \cdot 6H_2O$, 22.70 g 2-methylimidazole and 90 mL deionized water, and then the resulting mixture was stirred at room temperature for 12 h. Secondly, the resulting ZIF-67 seeds were dispersed in methanol to form seed suspension (0.1 wt%). Subsequently, the seed was deposited on the support surface by slip-coating in the above seed suspension, and then the seeded discs were placed vertically using a Teflon holder in a 45 mL Teflon beaker for hydrothermal synthesis at 30° C. for 6 h. The synthesis solution prepared by mixing 0.11 g $Co(NO_3)_2 \cdot 6H_2O$, 2.27 g 2-methylimidazole, and 40 mL DI water. After synthesis the discs were taken out, rinsed three times by water and methanol, and then immersed in 30 mL fresh methanol for another 12 h. Finally, the discs were dried in ambient conditions for 24 h.

Figure 6:
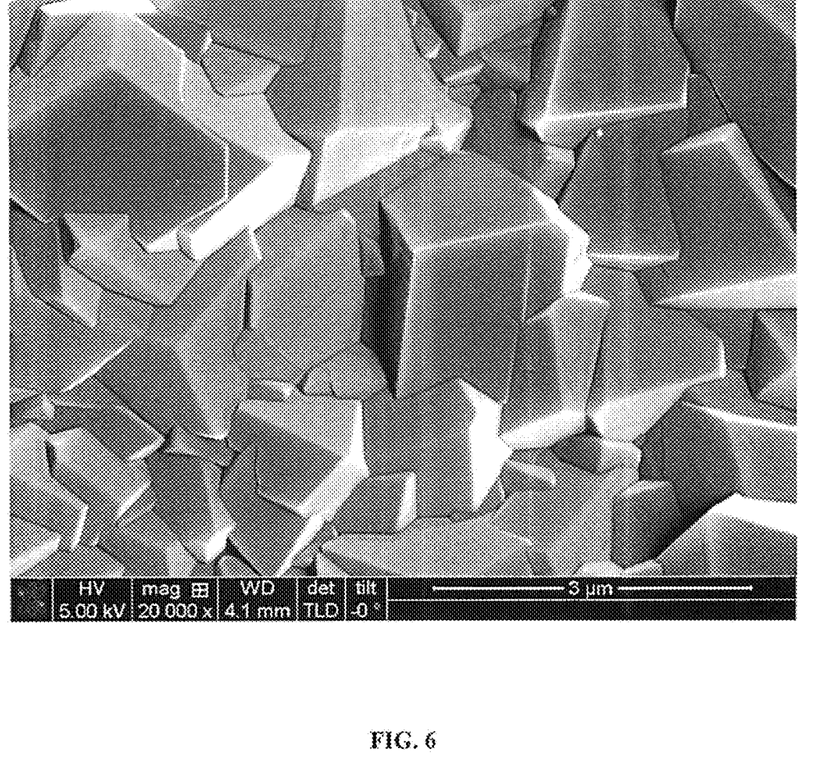
FIG. 6: SEM image of ZIF-67 membranes

FIG. 6 shows the top-view SEM image of a ZIF-67 membrane.

Example 6

Separation of Hydrogen Over Propane

Permeation measurements were performed by the Wicke-Kallenbach technique using an on-line gas chromatography. The experiments were conducted using binary gas mixtures (1:1 molar ratio) at room temperature (22° C.), the flow rate of each gas ($H_2$ and $C_3H_8$) was 10 mL/min. The pressures at feed side and permeate side were maintained constant at 1 bar. Argon was used as sweep gas, and the flow rate of sweep gas was set to 100 mL/min.

| Membrane Types | Permeance ($10^{-10}$ mol/m$^2 \cdot$ s $\cdot$ Pa) | | Separation factor |
| --- | --- | --- | --- |
| | $H_2$ | $C_3H_8$ | |
| ZIF-8 | 4360 | 8 | 545 |
| ZIF-67 | 4000 | 12 | 333 |
| ZIF-7 | 2100 | 8 | 262 |
| ZIF-65 | 3230 | 15 | 215 |

Example 7

Seperation of Hydrogen Over Propylene

Permeation measurements were performed by the Wicke-Kallenbach technique using an on-line gas chromatography. The experiments were conducted using binary gas mixtures (molar ratio 1:1) at room temperature (22° C.), the flow rate of each gas ($H_2$ and $C_3H_6$) was 10 mL/min. The pressures at feed side and permeate side were maintained constant at 1 bar. Argon was used as sweep gas, and the flow rate of sweep gas was set to 100 mL/min.

| Membrane Types | Permeance ($10^{-10}$ mol/m² · s · Pa) | | Separation factor |
|---|---|---|---|
| | $H_2$ | $C_3H_6$ | |
| ZIF-8 | 3800 | 160 | 24 |
| ZIF-67 | 3500 | 190 | 18 |
| ZIF-7 | 2040 | 200 | 10 |
| ZIF-65 | 3000 | 300 | 10 |

Example 8

Separation of Ethane Over Propane

Permeation measurements were performed by the Wicke-Kallenbach technique using an on-line gas chromatography. The experiments were conducted using binary gas mixtures (molar ratio 1:1) at room temperature (22° C.), the flow rate of each gas ($C_2H_6$ and $C_3H_8$) was 10 mL/min. The pressures at feed side and permeate side were maintained constant at 1 bar. Helium was used as sweep gas, and the flow rate of sweep gas was set as 100 mL/min.

| Membrane Types | Permeance ($10^{-10}$ mol/m² · s · Pa) | | Separation factor |
|---|---|---|---|
| | $C_2H_6$ | $C_3H_8$ | |
| ZIF-8 | 730 | 9 | 81 |
| ZIF-67 | 780 | 12 | 65 |
| ZIF-7 | 480 | 8 | 60 |
| ZIF-65 | 750 | 15 | 50 |

Example 9

Separation of Ethylene and Propylene

Permeation measurements were performed by the Wicke-Kallenbach technique using an on-line gas chromatography. The experiments were conducted using binary gas mixtures (molar ratio 1:1) at room temperature (22° C.), the flow rate of each gas ($C_2H_4$ and $C_3H_6$) was 10 mL/min. The pressures at feed side and permeate side were maintained constant at 1 bar. Helium was used as sweep gas, and the flow rate of sweep gas was set to 100 mL/min.

| Membrane Types | Permeance ($10^{-10}$ mol/m² · s · Pa) | | Separation factor |
|---|---|---|---|
| | $C_2H_4$ | $C_3H_6$ | |
| ZIF-8 | 1500 | 150 | 10 |
| ZIF-67 | 1340 | 190 | 7 |
| ZIF-7 | 1000 | 200 | 5 |
| ZIF-65 | 1500 | 300 | 5 |

Example 10

Separation of Ethylene and Propane

Permeation measurements were performed by the Wicke-Kallenbach technique using an on-line gas chromatography. The experiments were conducted using binary gas mixtures (molar ratio 1:1) at room temperature (22° C.), the flow rate of each gas ($C_2H_4$ and $C_3H_8$) was 10 mL/min. The pressures at feed side and permeate side were maintained constant at 1 bar. Helium was used as sweep gas, and the flow rate of sweep gas was set as 100 mL/min.

| Membrane Types | Permeance ($10^{-10}$ mol/m² · s · Pa) | | Separation factor |
|---|---|---|---|
| | $C_2H_4$ | $C_3H_8$ | |
| ZIF-8 | 1500 | 9 | 167 |
| ZIF-67 | 1340 | 12 | 111 |
| ZIF-7 | 870 | 8 | 109 |
| ZIF-65 | 1500 | 15 | 100 |

Example 11

Separation of Propylene and Propane

Permeation measurements were performed by the Wicke-Kallenbach technique using an on-line gas chromatography. The experiments were conducted using binary gas mixtures (molar ratio 1:1) at room temperature (22° C.), the flow rate of each gas ($C_3H_6$ and $C_3H_8$) was 10 mL/min. The pressures at feed side and permeate side were maintained constant at 1 bar. Helium was used as sweep gas, and the flow rate of sweep gas was set as 100 mL/min.

| Membrane Types | Permeance ($10^{-10}$ mol/m² · s · Pa) | | Separation factor |
|---|---|---|---|
| | $C_3H_6$ | $C_3H_8$ | |
| ZIF-8 | 200 | 8 | 25 |
| ZIF-67 | 80 | 12 | 6 |
| ZIF-7 | 60 | 13 | 5 |
| ZIF-65 | 40 | 8 | 5 |

Example 12

Separation of Ethanol and Isopropanol

Separation of ethanol and isopropanol mixtures is a challenging task since these two components have close boiling points and form azeotrope. The separation performances were measured through vapor permeations. A stream of argon at flow rate of 20 mL/min was bubbled through an equal molar liquid mixture of ethanol and isopropanol at room temperature (~22° C.). The leaving stream contains saturate vapors of ethanol and isopropanol, which correspond to volume percentage of 3.3 for ethanol and 2.3 for isopropanol. The stream was then fed to the permeation cell for separation. On the permeate side, argon at flow rate of 20 mL/min was used as the purge gas to carry away all the permeate species to a Gas Chromatography for one-line composition analysis. The total flow rate of the permeate stream was measured by a soap bubble meter. Based on the measured total flow rate and the concentrations of the permeate stream, the separation factor as well as the permeances of ethanol and isopropanol could be obtained and the results are listed in the table below.

| Membrane Types | Permeance ($10^{-10}$ mol/m² · s · Pa) | | Separation factor |
| --- | --- | --- | --- |
| | $C_3H_6$ | $C_3H_8$ | |
| ZIF-8 | 800 | 1.6 | 500 |
| ZIF-67 | 380 | 2 | 190 |
| ZIF-7 | 360 | 1.3 | 277 |
| ZIF-65 | 240 | 2.8 | 86 |

The invention claimed is:

1. A process for making ZIF membranes comprising:
   exposing a support material to a ZIF synthesis solution comprising metal ions or metal clusters, and imidazolate under conditions suitable for ZIF crystal formation; and
   forming a ZIF membrane having a thickness in a range from about 1 micron to about 100 microns and a pore size in a range from 0.2 nm to about 0.5 nm.

2. The process of claim 1 wherein the membrane material is a ZIF material with pore size from 0.3 nm to 0.4 nm.

3. The process of claim 2 wherein the ZIF material is ZIF-8, ZIF-67, ZIF-7 or ZIF-65.

4. The process of claim 3 wherein the ZIF materials is ZIF-8 and ZIF-67.

5. The process of claim 4 wherein the membrane is synthesized in aqueous solution.

6. The process of claim 4 wherein the membrane is synthesized at a temperature between 10 to 100° C.

7. The process of claim 1 wherein the support material is alpha-alumina, stainless steel, nickel, glass or polymer.

8. The process of claim 1 wherein the support material is flat-sheet, tube, hollow fiber or monolith.

9. A method to separate mixtures of C2− and C3+ components, comprising
   providing a stream containing at least one component of C2− and at least one component of C3+ in different composition ratios;
   providing a ZIF membrane comprising a plurality of porous ZIF grains that form a ZIF layer supported on a support materials, wherein the ZIF layer has a thickness in the range from 1 micron to 100 micron and a pore size in the range from 0.2 nm to 0.5 nm; and
   performing a membrane separation process by feeding the stream to be separated to the feed side of the membrane such that C2− hydrocarbon will pass preferentially through the membrane thereby providing a permeate stream enriched in C2− hydrocarbons and a retentate enriched in C3+ hydrocarbon.

10. The method of claim 9, wherein the C2− component is hydrogen, nitrogen, oxygen, methane ethane or ethanol.

11. The method of claim 9, wherein the C3+ component is propane, propylene, butane, butylenes, isobutene, propanol, isopropanol or butanol.

12. A method as in claim 9, wherein the support material is alpha-alumina, stainless steel, nickel, glass or polymer.

13. A method as in claim 9, wherein the support material is flat-sheet, tube, hollow fiber or monolith.

14. A method as in claim 9, wherein the driving force for the membrane separation process is provided either by applying pressure on the feed side or by drawing a vacuum on the permeate side.

15. A process as in claim 9, where a mixture of hydrogen and propane can be separated with separation factor of at least 40, with permeance of hydrogen greater than $2000 \times 10^{-10}$ [mol/m² s Pa].

16. A process as in claim 9, where a mixture of hydrogen and propylene can be separated with separation factor of at least 10, with permeance of hydrogen greater than $2000 \times 10^{-10}$ [mol/m² s Pa].

17. A process as in claim 9, where a mixture of ethane and propane can be separated with separation factor of at least 40, with permeance of ethane greater than $500 \times 10^{-10}$ [mol/m² s Pa].

18. A process as in claim 9, where a mixture of ethylene and propylene can be separated with separation factor of at least 5, with permeance of ethylene greater than $1000 \times 10^{-10}$ [mol/m² s Pa].

19. A process as in claim 9, where a mixture of ethylene and propane can be separated with separation factor of at least 40, with permeance of ethylene greater than $800 \times 10^{-10}$ [mol/m² s Pa].

20. A process as in claim 9, where a mixture of ethanol and isopropanol can be separated with separation factor of at least 500, with permeance of ethanol greater than $8 \times 10^{-8}$ [mol/m² s Pa].

21. A method to separate mixtures of propylene and propane components, comprising
   providing a stream containing a propylene component and a propane component;
   providing a ZIF membrane comprising a plurality of porous ZIF grains that form a ZIF layer supported on a support materials, wherein the ZIF layer has a thickness in the range from 1 micron to 100 micron and a pore size in the range from 0.2 nm to 0.5 nm; and
   performing a membrane separation process by feeding the stream to be separated to the feed side of the membrane such that propylene will pass preferentially through the membrane thereby providing a permeate stream enriched in propylene and a retentate enriched in propane.

22. A process as in claim 9, where a mixture of propylene and propane can be separated with a separation factor of at least 25, with permeance of propylene greater than $2 \times 10^{-8}$ [mol/m² s Pa].

23. The process of claim 1, further comprising depositing a plurality of ZIF seed particles having a pore size from about 0.2 nm to about 0.5 nm on a support forming a ZIF seed layer prior to exposing the support to the ZIF synthesis solution.

* * * * *